United States Patent
Benvegnu et al.

(10) Patent No.: US 11,715,193 B2
(45) Date of Patent: Aug. 1, 2023

(54) COLOR IMAGING FOR CMP MONITORING

(71) Applicant: Applied Materials, Inc., Santa Clara, CA (US)

(72) Inventors: Dominic J. Benvegnu, La Honda, CA (US); Robert D. Tolles, San Jose, CA (US); Boguslaw A. Swedek, Cupertino, CA (US); Abraham Ravid, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 627 days.

(21) Appl. No.: 16/744,058

(22) Filed: Jan. 15, 2020

(65) Prior Publication Data

US 2020/0151868 A1 May 14, 2020

Related U.S. Application Data

(62) Division of application No. 14/942,777, filed on Nov. 16, 2015, now Pat. No. 10,565,701.

(51) Int. Cl.
*G06T 7/00* (2017.01)
*H04N 23/10* (2023.01)
(Continued)

(52) U.S. Cl.
CPC .......... *G06T 7/0006* (2013.01); *B24B 37/013* (2013.01); *G06F 3/0486* (2013.01);
(Continued)

(58) Field of Classification Search
None
See application file for complete search history.

(56) References Cited

U.S. PATENT DOCUMENTS

| 5,309,228 A | 5/1994 | Nakamura |
| 5,337,140 A | 8/1994 | Hagiwara et al. |

(Continued)

FOREIGN PATENT DOCUMENTS

| CN | 104275642 | 1/2015 |
| EP | 0514933 | 12/1992 |

(Continued)

OTHER PUBLICATIONS

TW Office Action in Taiwanese Application No. 105132300, dated May 14, 2020, 8 pages.

(Continued)

*Primary Examiner* — Patrick F Valdez
(74) *Attorney, Agent, or Firm* — Fish & Richardson P.C.

(57) ABSTRACT

A metrology technique for analyzing a substrate includes storing data indicating a boundary of an area in a 2-dimensional color space having a pair of color channels including a first color channel and a second color channel as axes of the color space, receiving color data of a substrate from a camera, generating a color image of the substrate from the color data, performing a comparison of a pair of color values for the pair of color channels for the pixel to the boundary of the area in the 2-dimensional color space for each pixel of a plurality of pixels of the color image to determine whether the pair of color values meet thresholds provided by the boundary, and generating a signal to an operator based on results of the comparison for the plurality of pixels.

17 Claims, 6 Drawing Sheets

(51) Int. Cl.
*B24B 37/013* (2012.01)
*G06F 3/04842* (2022.01)
*G06F 3/04847* (2022.01)
*G06F 3/0486* (2013.01)
*G06T 5/00* (2006.01)
*G06T 5/50* (2006.01)

(52) U.S. Cl.
CPC ...... *G06F 3/04842* (2013.01); *G06F 3/04847* (2013.01); *G06T 5/002* (2013.01); *G06T 5/50* (2013.01); *G06T 7/0004* (2013.01); *H04N 23/10* (2023.01); *G06T 2207/10024* (2013.01); *G06T 2207/20024* (2013.01); *G06T 2207/20216* (2013.01); *G06T 2207/30148* (2013.01)

(56) References Cited

U.S. PATENT DOCUMENTS

| | | | |
|---|---|---|---|
| 5,738,574 | A | 4/1998 | Tolles et al. |
| 6,106,662 | A | 8/2000 | Bibby et al. |
| 6,142,855 | A | 11/2000 | Nyui et al. |
| 6,213,847 | B1 | 4/2001 | Torii |
| 6,361,646 | B1 | 3/2002 | Bibby et al. |
| 6,466,642 | B1 | 10/2002 | Meloni |
| 6,503,361 | B1 | 1/2003 | Nyui et al. |
| 6,517,413 | B1 | 2/2003 | Hu et al. |
| 6,609,947 | B1 * | 8/2003 | Moore ............... B24B 49/12 451/6 |
| 6,752,689 | B2 | 6/2004 | Finarov |
| 6,882,416 | B1 | 4/2005 | Hunter et al. |
| 6,930,782 | B1 * | 8/2005 | Yi ........................ G06T 7/70 356/504 |
| 7,008,295 | B2 | 3/2006 | Wiswesser et al. |
| 7,207,862 | B2 | 4/2007 | Nabeya et al. |
| 7,423,669 | B2 | 9/2008 | Oya et al. |
| 7,508,504 | B2 | 3/2009 | Jin et al. |
| 8,292,693 | B2 | 10/2012 | David et al. |
| 8,939,074 | B2 | 1/2015 | Prince |
| 11,100,628 | B2 | 8/2021 | Motamedi et al. |
| 2002/0016066 | A1 | 2/2002 | Birang et al. |
| 2003/0039387 | A1 | 2/2003 | Park et al. |
| 2003/0107736 | A1 * | 6/2003 | Fujimoto ............ G06T 7/32 356/394 |
| 2004/0012775 | A1 * | 1/2004 | Kinney ............. G01N 21/9501 356/237.2 |
| 2004/0012795 | A1 | 1/2004 | Moore |
| 2004/0080757 | A1 | 4/2004 | Stanke et al. |
| 2004/0235205 | A1 | 11/2004 | Levy et al. |
| 2004/0259472 | A1 | 12/2004 | Chalmers et al. |
| 2005/0213793 | A1 | 9/2005 | Oya et al. |
| 2005/0240366 | A1 | 10/2005 | Mestha et al. |
| 2006/0017855 | A1 | 1/2006 | Yamada |
| 2006/0061746 | A1 | 3/2006 | Kok et al. |
| 2006/0166608 | A1 * | 7/2006 | Chalmers ............ B24B 37/013 451/6 |
| 2007/0077671 | A1 | 4/2007 | David et al. |
| 2008/0031510 | A1 | 2/2008 | Jung |
| 2008/0197280 | A1 * | 8/2008 | Tanaka .................... G01B 15/04 250/306 |
| 2008/0226156 | A1 * | 9/2008 | Ota ..................... G06T 7/001 382/141 |
| 2008/0239308 | A1 | 10/2008 | Ravid et al. |
| 2008/0243433 | A1 * | 10/2008 | Ravid ............... H01L 21/67161 702/170 |
| 2009/0014409 | A1 | 1/2009 | Grimbergen |
| 2009/0098804 | A1 | 4/2009 | Lim et al. |
| 2009/0153352 | A1 | 6/2009 | Julio |
| 2010/0067010 | A1 | 3/2010 | Sakai et al. |
| 2012/0026492 | A1 | 2/2012 | Zhang et al. |
| 2012/0293188 | A1 | 11/2012 | Nikolenko et al. |
| 2013/0030717 | A1 | 1/2013 | Halderman et al. |
| 2013/0288572 | A1 | 10/2013 | Benvegnu |
| 2014/0206259 | A1 | 7/2014 | Benvegnu et al. |
| 2015/0017880 | A1 | 1/2015 | Nomura et al. |
| 2015/0017887 | A1 | 1/2015 | Kobayashi et al. |
| 2015/0106057 | A1 | 4/2015 | Sugita et al. |
| 2015/0147940 | A1 | 5/2015 | Benvegnu et al. |
| 2015/0194356 | A1 | 7/2015 | Xu et al. |
| 2015/0206770 | A1 * | 7/2015 | Dinneen ................ H01L 22/12 205/82 |
| 2015/0248214 | A1 * | 9/2015 | Gilger ................ G06T 11/206 715/719 |
| 2015/0273649 | A1 | 10/2015 | Kosuge et al. |
| 2015/0294449 | A1 * | 10/2015 | Rheinheimer ........ G06T 7/0006 348/87 |
| 2015/0324970 | A1 | 11/2015 | Iwanaga et al. |
| 2015/0364387 | A1 | 12/2015 | Cho et al. |
| 2016/0314577 | A1 | 10/2016 | Lee et al. |
| 2017/0140525 | A1 | 5/2017 | Benvegnu et al. |
| 2018/0061032 | A1 | 3/2018 | Benvegnu |
| 2018/0103247 | A1 | 4/2018 | Kolchin et al. |
| 2018/0164227 | A1 | 6/2018 | Kim et al. |
| 2019/0197712 | A1 | 6/2019 | Talbert et al. |
| 2019/0244374 | A1 | 8/2019 | Benvegnu |
| 2020/0258214 | A1 | 8/2020 | Motamedi et al. |
| 2021/0358113 | A1 | 11/2021 | Motamedi et al. |

FOREIGN PATENT DOCUMENTS

| | | |
|---|---|---|
| EP | 0881484 | 12/1998 |
| JP | H03-94104 | 4/1991 |
| JP | H05-165120 | 6/1993 |
| JP | 3025480 | 6/1996 |
| JP | H11-330026 | 11/1999 |
| JP | 2001-345299 | 12/2001 |
| JP | 2003-014437 | 1/2003 |
| JP | 2004-009259 | 1/2004 |
| JP | 2005-312018 | 11/2005 |
| JP | 2007-147441 | 6/2007 |
| JP | 2007-194262 | 8/2007 |
| JP | 2009105230 A * | 5/2009 |
| JP | 2015-016529 | 1/2015 |
| JP | 2015-148447 | 8/2015 |
| JP | 2019-532274 | 11/2019 |
| TW | 200303807 | 9/2003 |
| TW | 200908184 | 2/2009 |
| TW | 201431645 | 8/2014 |
| TW | 201437043 | 10/2014 |
| WO | H07-182516 | 7/1995 |
| WO | WO 2011/094706 | 8/2011 |

OTHER PUBLICATIONS

International Search Report and Written Opinion in International Application No. PCT/US2016/059501, dated Feb. 16, 2017, 9 pages.

JP Office Action in Japanese Appln. No. 2018-524807, dated Jan. 5, 2021, 39 pages (with English translation).

Office Action in Chinese Appln. No. 201680064804.5, dated Feb. 7, 2022, 17 pages (with English translation).

Office Action in Taiwanese Appln. No. 110114032, dated Jul. 15, 2021, 4 pages (with English Search Report).

* cited by examiner

COLOR IMAGING FOR CMP MONITORING

CROSS-REFERENCE TO RELATED APPLICATIONS

This application is a divisional of U.S. application Ser. No. 14/942,777, filed on Nov. 16, 2015, the disclosure of which is incorporated by reference.

TECHNICAL FIELD

This disclosure relates to optical metrology, e.g., to detect the thickness of a layer on a substrate.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the metallic layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

Variations in the slurry distribution, the polishing pad condition, the relative speed between the polishing pad and the substrate, and the load on the substrate can cause variations in the material removal rate. These variations, as well as variations in the initial thickness of the substrate layer, cause variations in the time needed to reach the polishing endpoint. Therefore, determining the polishing endpoint merely as a function of polishing time can lead to overpolishing or underpolishing of the substrate.

Various optical metrology systems, e.g., spectrographic or ellipsometric, can be used to measure the thickness of the substrate layer pre-polishing and post-polishing, e.g., at an in-line or stand-alone metrology station. In addition, various in-situ monitoring techniques, such as optical or eddy current monitoring, can be used to detect a polishing endpoint.

SUMMARY

In one aspect, a polishing system includes a polishing station including a platen to support a polishing pad, a support to hold a substrate, an in-line metrology station to measure the substrate before or after polishing of a surface of the substrate in the polishing station, and a controller. The in-line metrology station includes a color line-scan camera having detector elements arranged along a first axis that is parallel to the surface of the substrate during scanning of the substrate, an elongated white light source having a longitudinal axis parallel to the first axis and configured to direct light toward the substrate at a non-zero incidence angle during scanning of the substrate, a frame supporting the light source and the camera, and a motor to cause relative motion between the frame and the support along a second axis perpendicular to the first axis to cause the light source and the camera to scan across the substrate. The controller is configured to receive a color data from the camera, to generate a 2-dimensional color image from the color data, and to control polishing at the polishing station based on the color image.

Implementations may include one or more of the following features. A diffuser may be positioned in a path of light between the light source and the substrate. The non-zero angle is between 5° and 85°. A circular polarizer may be positioned in a light path between the substrate and the camera.

The motor may be coupled to the frame and controller may be configured to cause the substrate to be held stationary while the motor moves the frame with the light source to cause the line-scan camera to scan across the substrate. The frame may be fixed, the motor may be coupled to the support, and the controller may be configured to cause the motor to move the support while the light source and the camera remain stationary to scan across the substrate. The support may include a carrier head to hold the substrate against the polishing pad and the in-line metrology station may be positioned between the polishing station and one of another polishing station or a transfer station. The support may include a transfer robot and the in-line metrology station may be positioned in a cassette interface unit.

In another aspect, a polishing system includes a polishing station including a platen to support a polishing pad, a support to hold a substrate, an in-line metrology station to measure the substrate before or after polishing of a surface of the substrate in the polishing station, and a controller. The in-line metrology station includes a color line-scan camera having detector elements arranged along a first axis that is parallel to the surface of the substrate during scanning of the substrate, a white light source, and a motor to cause relative motion between the frame and the support along a second axis perpendicular to the first axis to cause the light source and the line-scan camera to scan together across the substrate. The controller is configured to receive a color data from the camera, to generate a 2-dimensional color image from the color data, to transform the color image to a hue-saturation-luminance color space, and to compare hue and saturation values from the color image in the hue-saturation-luminance color space to respective hue and saturation thresholds to generate a thresholded image.

Implementations may include one or more of the following features. The controller may be configured to not compare luminance values from the color image in the hue-saturation-luminance color space to a threshold in determining whether a pixel is on or off in the thresholded image. The controller may be configured to analyze the color image to find a wafer alignment feature and to transform the color image to a standard coordinate system. The controller may be configured to normalize the color image. The controller may be is configured to apply a high-pass spatial filter to the image. The controller may be configured to generate a smoothed image by averaging pixel values within a threshold distance and to generate a filtered image by dividing the color image by the smoothed image. The spatial filtering may be performed only along an image axis corresponding to the first axis.

The controller may be configured to apply an image mask to the color image. The controller may be configured to count a number of pixels in the color image that fail to meet the threshold and to compare the number of pixels to a threshold. The controller may be configured to count a number of pixels for each die on the substrate in the color image. The controller may be configured to count a number of pixels for the whole substrate in the color image.

In another aspect, a computer program product includes a non-transitory computer readable medium encoded with instructions to cause a processor to display on a display a graph in hue-saturation space of an image of a substrate, receive user input selecting a portion of the graph by clicking and dragging from a first position to a second position in the graph, and generate an upper hue limit, a lower hue limit, an upper saturation limit and a lower saturation limit based on the first position and the second position.

Implementations can include one or more of the following potential advantages. Variation across the substrate of the thickness of the substrate layer can be determined, and unacceptable variations can be detected. This information can be used in a feed-forward or feed-back use to control polishing parameters, providing improved thickness uniformity. The algorithm to determine variations can be simple and have low computational load. The user interface to identify acceptable color thresholds is intuitive and permits the technique to be adaptable for many types of substrates, e.g., different patterns.

The details of one or more implementations are set forth in the accompanying drawings and the description below. Other aspects, features and advantages will be apparent from the description and drawings, and from the claims.

DESCRIPTION OF DRAWINGS

Like reference symbols in the various drawings indicate like elements.

DETAILED DESCRIPTION

The thickness of a layer on a substrate can be optically measured before or after polishing, e.g., at an in-line or stand-alone metrology station. However, some optical techniques such as spectrometry require expensive spectrographs and computationally heavy manipulation of spectra data. Even apart from computational load, in some situations the algorithm results do not meet the ever increasing accuracy requirements of the user. However, another metrology technique is to take a color image of the substrate, and analyze the image in a color space to determine regions with acceptable thickness.

Figure 1:
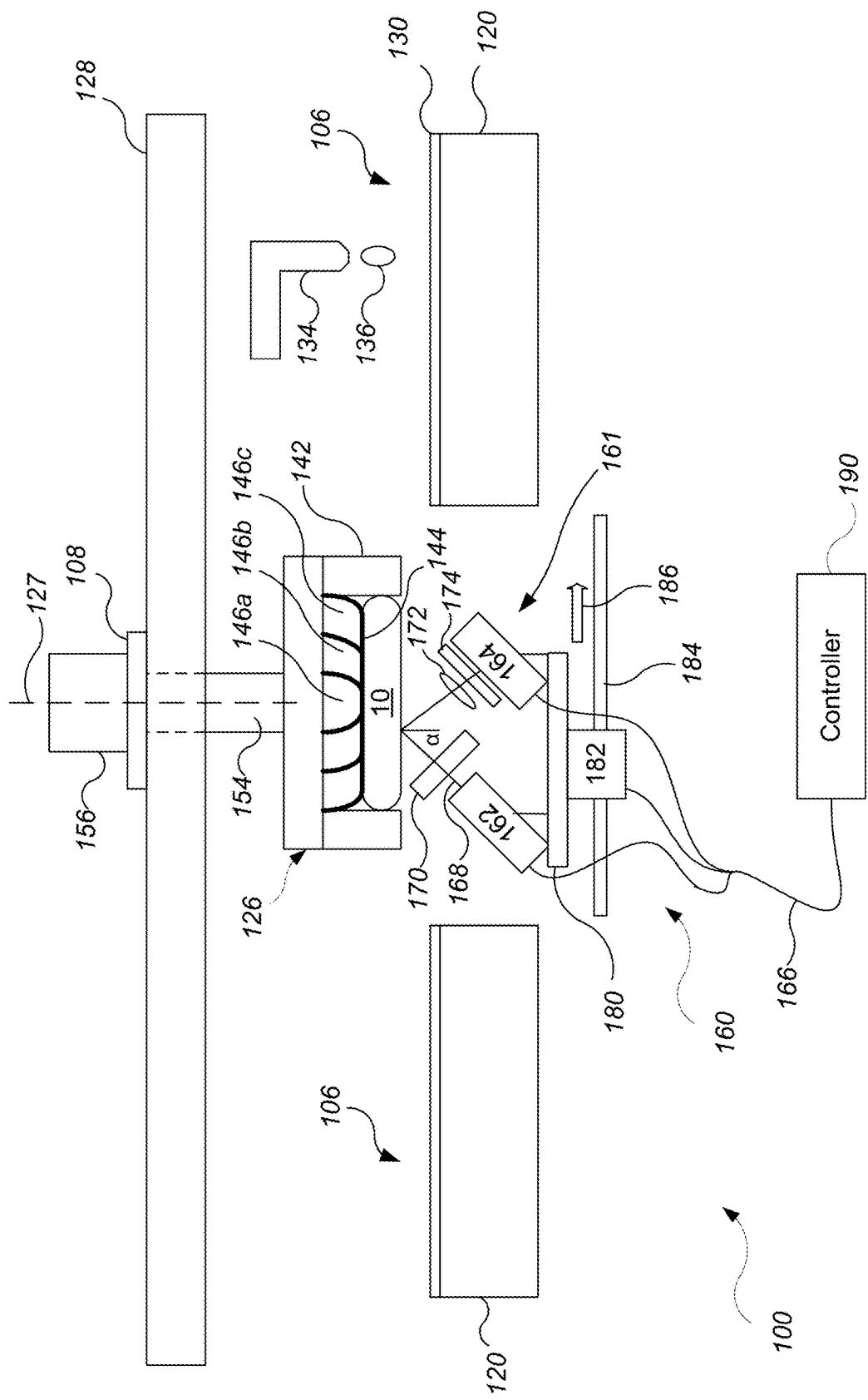
FIG. 1 illustrates a view of an example of an in-line optical measurement system.

Referring to FIG. 1, a polishing apparatus 100 includes an in-line (also referred to as in-sequence) optical metrology system 160, e.g., a color imaging system.

The polishing apparatus 100 includes one or more carrier heads 126, each of which is configured to carry a substrate 10, one or more polishing stations 106, and a transfer station to load substrate to and unload substrates from a carrier head. Each polishing station 106 includes a polishing pad 130 supported on a platen 120. The polishing pad 130 can be a two-layer polishing pad with an outer polishing layer and a softer backing layer.

The carrier heads 126 can be suspended from a support 128, and movable between the polishing stations. In some implementations, the support 128 is an overhead track and the carrier heads 126 are coupled to a carriage 108 that is mounted to the track. The overhead track 128 allows each carriage 108 to be selectively positioned over the polishing stations 106 and the transfer station. Alternatively, in some implementations the support 128 is a rotatable carousel, and rotation of the carousel moves the carrier heads 126 simultaneously along a circular path.

Each polishing station 106 of the polishing apparatus 100 can include a port, e.g., at the end of an arm 134, to dispense polishing liquid 136, such as abrasive slurry, onto the polishing pad 130. Each polishing station 106 of the polishing apparatus 100 can also include pad conditioning apparatus to abrade the polishing pad 130 to maintain the polishing pad 130 in a consistent abrasive state.

Each carrier head 126 is operable to hold a substrate 10 against the polishing pad 130. Each carrier head 126 can have independent control of the polishing parameters, for example pressure, associated with each respective substrate. In particular, each carrier head 126 can include a retaining ring 142 to retain the substrate 10 below a flexible membrane 144. Each carrier head 126 also includes a plurality of independently controllable pressurizable chambers defined by the membrane, e.g., three chambers 146a-146c, which can apply independently controllable pressurizes to associated zones on the flexible membrane 144 and thus on the substrate 10. Although only three chambers are illustrated in FIG. 1 for ease of illustration, there could be one or two chambers, or four or more chambers, e.g., five chambers.

Each carrier head 126 is suspended from the support 128, and is connected by a drive shaft 154 to a carrier head rotation motor 156 so that the carrier head can rotate about an axis 127. Optionally each carrier head 126 can oscillate laterally, e.g., by driving the carriage 108 on the track 128, or by rotational oscillation of the carousel itself. In operation, the platen is rotated about its central axis 121, and each carrier head is rotated about its central axis 127 and translated laterally across the top surface of the polishing pad. The lateral sweep is in a direction parallel to the polishing surface 212. The lateral sweep can be a linear or arcuate motion.

A controller 190, such as a programmable computer, is connected to each motor to independently control the rotation rate of the platen 120 and the carrier heads 126. For example, each motor can include an encoder that measures the angular position or rotation rate of the associated drive shaft. Similarly, the controller 190 is connected to an actuator in each carriage 108 and/or the rotational motor for the carousel to independently control the lateral motion of each carrier head 126. For example, each actuator can include a linear encoder that measures the position of the carriage 108 along the track 128.

The controller 190 can include a central processing unit (CPU) 192, a memory 194, and support circuits 196, e.g., input/output circuitry, power supplies, clock circuits, cache, and the like. The memory is connected to the CPU 192. The memory is a non-transitory computable readable medium, and can be one or more readily available memory such as random access memory (RAM), read only memory (ROM), floppy disk, hard disk, or other form of digital storage. In addition, although illustrated as a single computer, the controller 190 could be a distributed system, e.g., including multiple independently operating processors and memories.

The in-line optical metrology system 160 is positioned within the polishing apparatus 100, but does not perform measurements during the polishing operation; rather measurements are collected between polishing operations, e.g., while the substrate is being moved from one polishing station to another or from or to the transfer station.

The in-line optical metrology system 160 includes a sensor assembly 161 supported at a position between two of the polishing stations 106, e.g., between two platens 120. In particular, the sensor assembly 161 is located at a position such that a carrier head 126 supported by the support 128 can position the substrate 10 over the sensor assembly 161.

In implementations in which the polishing apparatus 100 include three polishing stations and carries the substrates sequentially from the first polishing station to the second polishing station to the third polishing station, one or more sensor assemblies 161 can be positioned between the transfer station and the first polishing station, between first and second polishing stations, between the second and third polishing stations, and/or between the third polishing station and the transfer station.

The sensor assembly 161 can include a light source 162, a light detector 164, and circuitry 166 for sending and receiving signals between the controller 190 and the light source 162 and light detector 164.

The light source 162 can be operable to emit white light. In one implementation, the white light emitted includes light having wavelengths of 200-800 nanometers. A suitable light source is an array of white-light light emitting diodes (LEDs), or a xenon lamp or a xenon mercury lamp. The light source 162 is oriented to direct light 168 onto the exposed surface of the substrate 10 at a non-zero angle of incidence a. The angle of incidence a can be, for example, about 30° to 75°, e.g., 50°.

The light source can illuminate a substantially linear elongated region that spans the width of the substrate 10. The light source 162 can include optics, e.g., a beam expander, to spread the light from the light source into an elongated region. Alternatively or in addition, the light source 162 can include a linear array of light sources. The light source 162 itself, and the region illuminated on the substrate, can be elongated and have a longitudinal axis parallel to the surface of the substrate.

A diffuser 170 can be placed in the path of the light 168, or the light source 162 can include a diffuser, to diffuse the light before it reaches the substrate 10.

The detector 164 is a color camera that is sensitive to light from the light source 162. The camera includes an array of detector elements. For example, the camera can include a CCD array. In some implementations, the array is a single row of detector elements. For example, the camera can be a linescan camera. The row of detector elements can extend parallel to the longitudinal axis of the elongated region illuminated by the light source 162. Where the light source 162 includes a row of light emitting elements, the row of detector elements can extend along a first axis parallel to the longitudinal axis of the light source 162. A row of detector elements can include 1024 or more elements.

The camera 164 is configured with appropriate focusing optics 172 to project a field of view of the substrate onto the array of detector elements 178. The field of view can be long enough to view the entire width of the substrate 10, e.g., 150 to 300 mm long. The camera 164, including associated optics 172, can be configured such that individual pixels correspond to a region having a length equal to or less than about 0.5 mm. For example, assuming that the field of view is about 200 mm long and the detector 164 includes 1024 elements, then an image generated by the linescan camera can have pixels with a length of about 0.5 mm. To determine the length resolution of the image, the length of the field of view (FOV) can be divided by the number of pixels onto which the FOV is imaged to arrive at a length resolution.

The camera 164 can be also be configured such that the pixel width is comparable to the pixel length. For example, an advantage of a linescan camera is its very fast frame rate. The frame rate can be at least 5 kHz. The frame rate can be set at a frequency such that as the imaged area scans across the substrate 10, the pixel width is comparable to the pixel length, e.g., equal to or less than about 0.3 mm.

The light source 162 and the light detector 164 can be supported on a stage 180. Where the light detector 164 is a line-scan camera, the light source 162 and camera 164 are movable relative to the substrate 10 such that the imaged area can scan across the length of the substrate. In particular, the relative motion can be in a direction parallel to the surface of the substrate 10 and perpendicular to the row of detector elements of the linescan camera 164.

In some implementations, the stage 180 is stationary, and the carrier head 126 moves, e.g., either by motion of the carriage 108 or by rotational oscillation of the carousel. In some implementations, the stage 180 is movable while the carrier head remains stationary for the image acquisition. For example, the stage 180 can be movable along a rail 184 by a linear actuator 182. In either case, this permits the light source 162 and camera 164 to stay in a fixed position relative to each other as the area being scanned moves across the substrate 10.

A possible advantage of having a line-scan camera and light source that move together across the substrate is that, e.g., as compared to a conventional 2D camera, the relative angle between the light source and the camera remains constant for different positions across the wafer. Consequently, artefacts caused by variation in the viewing angle can be reduced or eliminated. In addition, a line scan camera can eliminate perspective distortion, whereas a conventional 2D camera exhibits inherent perspective distortion, which then needs to be corrected by an image transformation.

The sensor assembly 161 can include a mechanism to adjust vertical distance between the substrate 10 and the light source 162 and detector 164. For example, the sensor assembly 161 can include an actuator to adjust the vertical position of the stage 180.

Optionally a polarizing filter 174 can be positioned in the path of the light, e.g., between the substrate 10 and the detector 164. The polarizing filter 184 can be a circular polarizer (CPL). A typical CPL is a combination of a linear polarizer and quarter wave plate. Proper orientation of the polarizing axis of the polarizing filter 184 can reduce haze in the image and sharpen or enhance desirable visual features.

Assuming that the outermost layer on the substrate is a semitransparent layer, e.g., a dielectric layer, the color of light detected at detector 164 depends on, e.g., the composition of the substrate surface, substrate surface smoothness, and/or the amount of interference between light reflected from different interfaces of one or more layers (e.g., dielectric layers) on the substrate.

As noted above, the light source 162 and light detector 164 can be connected to a computing device, e.g., the controller 190, operable to control their operation and receive their signals.

Figure 2:
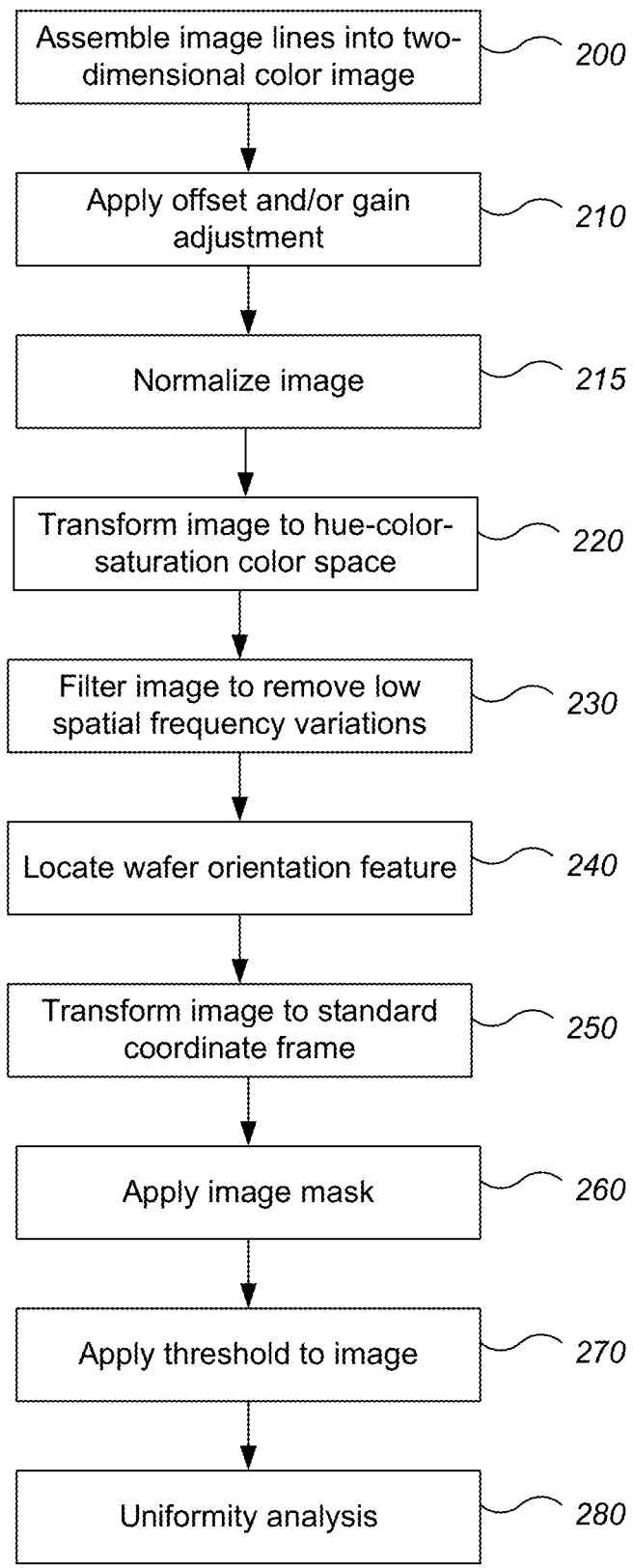
FIG. 2 is a flow chart for a method of detecting acceptable variations.
Figure 3:
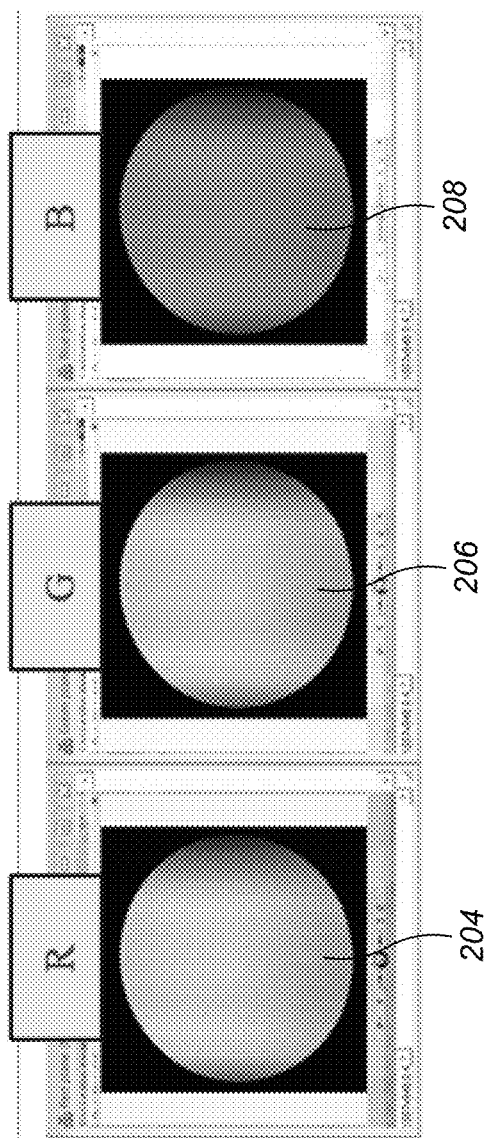
FIG. 3 illustrates exemplary images of a substrate in red, green and blue color channels.

Referring to FIG. 2, the controller assembles the individual image lines from the light detector 164 into a two-dimensional color image (step 200). The camera 164 can include separate detector elements for each of red, blue and green. The two-dimensional color image can include a monochromatic image 244, 246, 248 for each of the red, blue and green color channels (see FIG. 3).

The controller can apply an offset and/or a gain adjustment to the intensity values of the image in each color channel (step 210). Each color channel can have a different offset and/or gain.

Optionally, the image can be normalized (step 215). For example, the difference between the measured image and a standard predefined image can be calculated. For example, the controller can store a background image for each of the red, green and blue color channels, and the background image can be subtracted from the measured image for each color channel. Alternatively, the measured image can be divided by the standard predefined image.

The image can be transformed from a red green blue (RGB) color space to a hue saturation luminance (HSL) color space (step 220). The transformation can take place after gain adjustments in the RGB color space. An exemplary transformation from 8-bit (0 to 255) RGB color space to HSL color space is as follows:

*RBG* to *HSL* conversion formula

The *R, G, B* values are divided by 255 to change the range from 0 ... 255 to 0 ... 1

$$R' = R/255$$
$$G' = G/255$$
$$B' = B/255$$
$$Cmax = \max(R', G', B')$$
$$Cmin = \min(R', G', B')$$
$$\Delta = Cmax = Cmin$$

Hue calculation:

$$H = \begin{cases} 0°, \Delta = 0 \\ 60° \times \left(\frac{G' - B'}{\Delta} \bmod 6\right), Cmax = R' \\ 60° \times \left(\frac{B' - R'}{\Delta} + 2\right), Cmax = G' \\ 60° \times \left(\frac{B' - G'}{\Delta} + 4\right), Cmax = B' \end{cases}$$

Saturation calculation:

$$S = \begin{cases} 0, \Delta = 0 \\ \frac{\Delta}{1 - |2L - 1|}, \Delta <> 0 \end{cases}$$

Lightness calculation:

$$L = (Cmax + Cmin)/2$$

Figure 4:
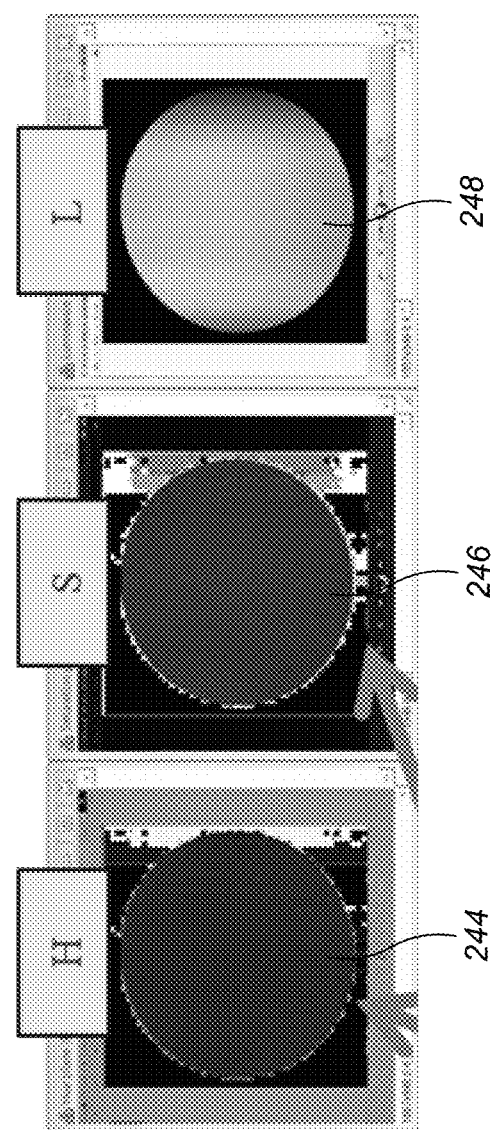
FIG. 4 illustrates exemplary images of a substrate in hue, saturation and luminance color channels.

This provides a scalar image 224, 226, 228 for each of the hue, saturation and luminance channels (see FIG. 4).

The image can be filtered to remove low-frequency spatial variations (step 230). In some implementations, only a luminance channel is filtered to remove low-frequency spatial variations, i.e., hue and saturation channels are not filtered. In some implementations, the luminance channel is used to generate the filter, which is then applied to the red, green and blue images, and the resulting image is then converted back to the HSL color space.

Figure 5:
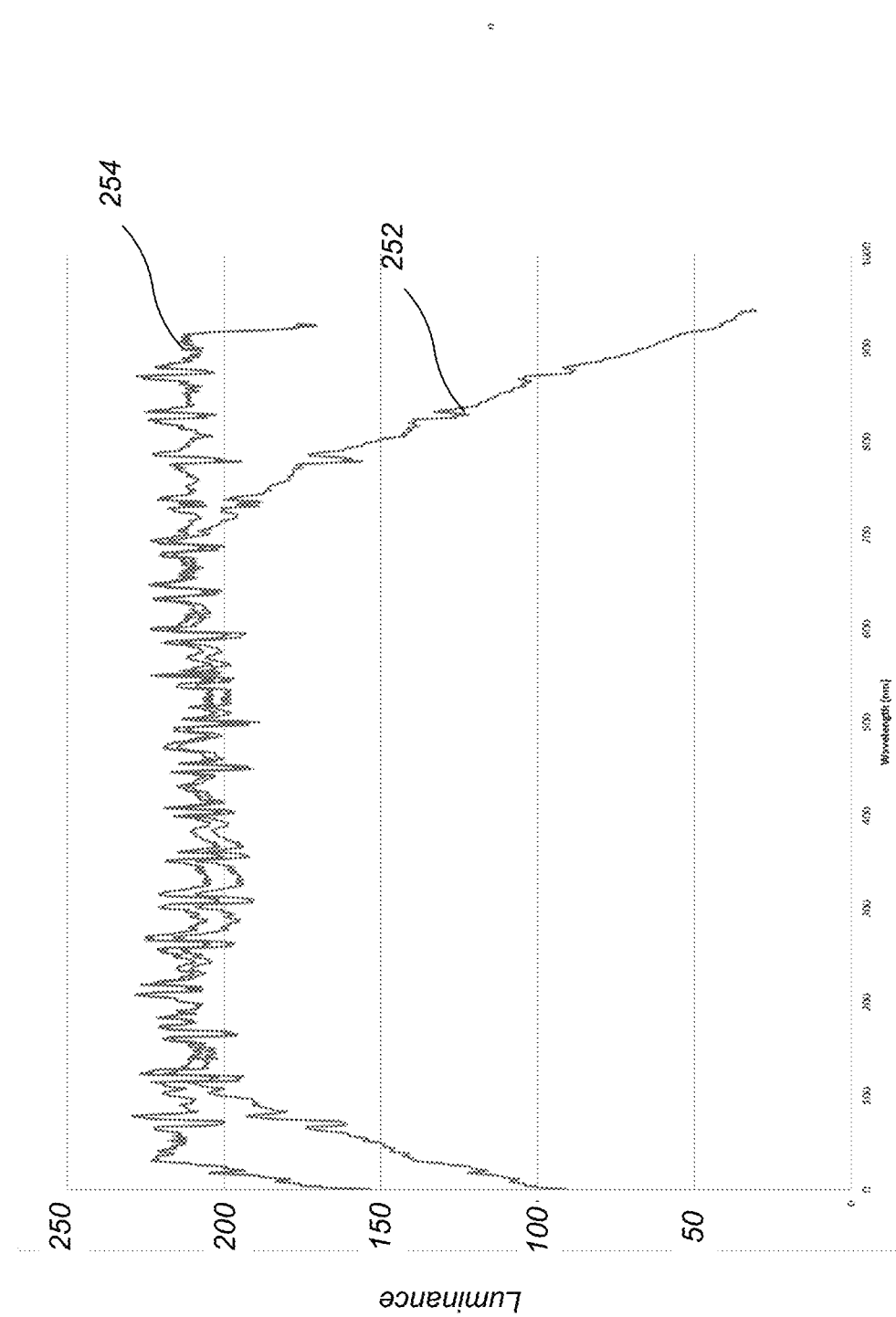
FIG. 5 illustrate exemplary graphs of intensity as a function of pixel position for an unsmoothed image and a filtered image.

In some implementations of the filtering, a smoothing filter is applied to the image in the luminance channel, e.g., averaging over a span of 20 pixels, to generate a smoothed luminance image. In some implementations, the image in the luminance channel is divided by the smoothed luminance image to generate the filtered image; the hue and saturation channels are not modified as part of the spatial filtering. In some other implementations, the image in each color channel, i.e., each of the red, green and blue channels is divided by the smoothed luminance image. The resulting filtered image with filtered red, green and blue images are then converted back to the HSL color space to generated luminance, hue and saturation images. This can generate an image in which low-frequency attributable to variations in illumination are removed, but high-frequency spatial variations in the image data are maintained. For example, FIG. 5 is an exemplary graph of intensity as a function of pixel position along the first axis in the luminance channel for both the unsmoothed image, shown by line 252, and the filtered image, shown by line 254.

In some implementations, the smoothing is performed only along the first axis. For example, the luminance values of the pixels along the direction of travel 186 can be averaged together to provide an average luminance value that is a function of just the position along the first axis. Then each row of image pixels can be divided by the corresponding portion of the average luminance value that is a function of the position along the first axis.

Figure 6:
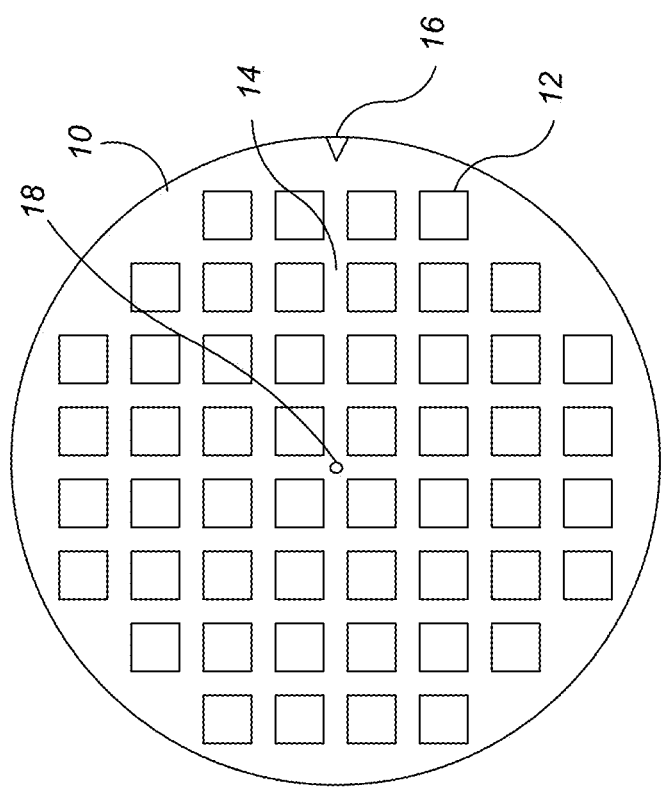
FIG. 6 is a schematic top view of a substrate.

The controller can use image processing techniques to analyze the image to locate a wafer orientation feature 16, e.g., a wafer notch or wafer flat, on the substrate 10 (see FIG. 6) (step 240). Image processing techniques can also be used to locate a center 18 of the substrate 10 (see FIG. 6).

Based on this data, the image is transformed, e.g., scaled and/or rotated and/or translated, into a standard image coordinate frame (step 250). For example, the image can be translated so that the wafer center is at the center point of the image and/or the image can be scaled so that the edge of the substrate is at the edge of the image, and/or the image can be rotated so that there is a 0° angle between the x-axis of the image and the radial segment connecting the wafer center and the wafer orientation feature.

Figure 7:
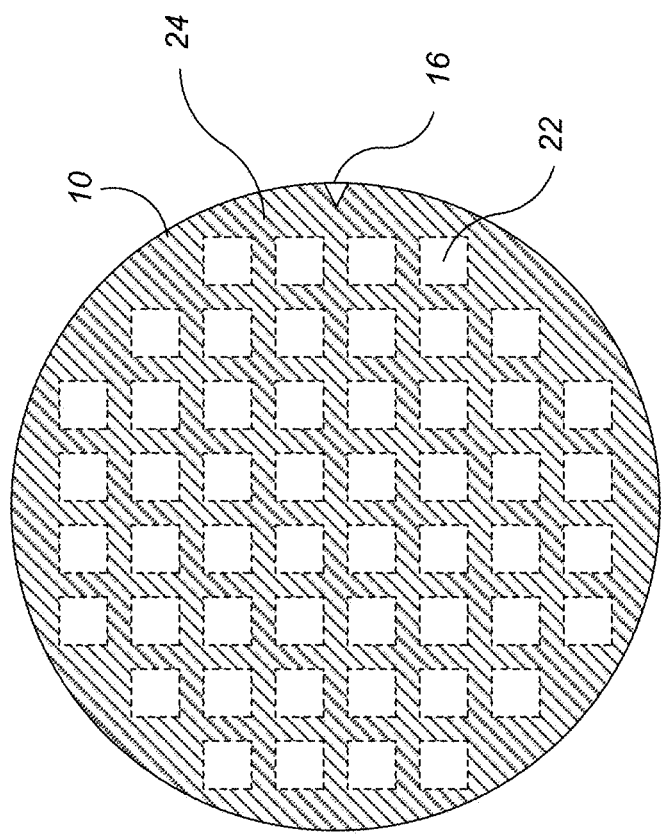
FIG. 7 is a schematic view of a mask.

Optionally, an image mask can applied to screen out portions of the image data (step 260). For example, referring to FIG. 6, a typical substrate 10 includes multiple dies 12. Scribe lines 14 can separate the dies 12. For some applications, it may be useful to process only image data corresponding to the dies. In this case, referring to FIG. 7, an image mask can be stored by the controller, with unmasked region 22 corresponding in spatial position to the dies 12 and masked region 24 corresponding to the scribe lines 14. Image data corresponding to the masked region 24 is not processed or not used during the thresholding step. Alternatively, the masked region 24 could correspond to the dies so that the unmasked region corresponds to the scribe lines, or the unmasked region could be only a portion of each die with a remainder of each die being masked.

The hue and saturation data at this stage can be used in feed-forward or feed-back algorithm use to control polishing parameters, providing improved thickness uniformity. For example, the hue and saturation for each pixel can be compared to a target hue and saturation to generate an error signal image, and this error signal image can be used for feed-forward or feed-back control.

Next, the image is subjected to a thresholding process (step 270). In particular, a thresholding process can be performed for both the hue and saturation color channels. In some implementations, thresholding is not performed for the luminance channel.

For example, the controller 190 can store an upper hue limit UHL and a lower hue limit LHL for the hue channel, and an upper saturation limit USL and a lower saturation limit LSL for the saturation channel. For each pixel, the hue value H of the pixel is compared to the upper hue limit UHL and the lower hue limit LHL, and the saturation value S of the pixel is compared to the upper saturation limit USL and the lower saturation limit LSL. If the hue value and saturation value both fall within the limits, then the pixel is marked as "passing" the threshold, e.g., assigned a value of 1. In contrast, if either the hue value or the saturation value or both fall outside the limits, then the pixel is marked as "failing" the threshold, e.g., assigned a value of 0. In short, the threshold image T(x,y) can be calculated as if LHL≤H(x,y)≤UHL AND LSL≤S(x,y)≤USL then T(x,y)=1 else T(x,y)=0

In some implementations, the luminance value of the pixel is not compared to a threshold to determine the threshold image.

An advantage of performing thresholding in the hue-saturation color space is that spatial variations in the hue-saturation color space are generally due to variation in stack properties of the substrate, e.g., variations in thickness in one or more layers in the stack, rather than variations in the light source or other environmental factors. Consequently, thresholding in this space, rather than using luminance or an RGB color space, can provide increased reliability for detecting whether the substrate meets thickness specifications.

Figure 8:
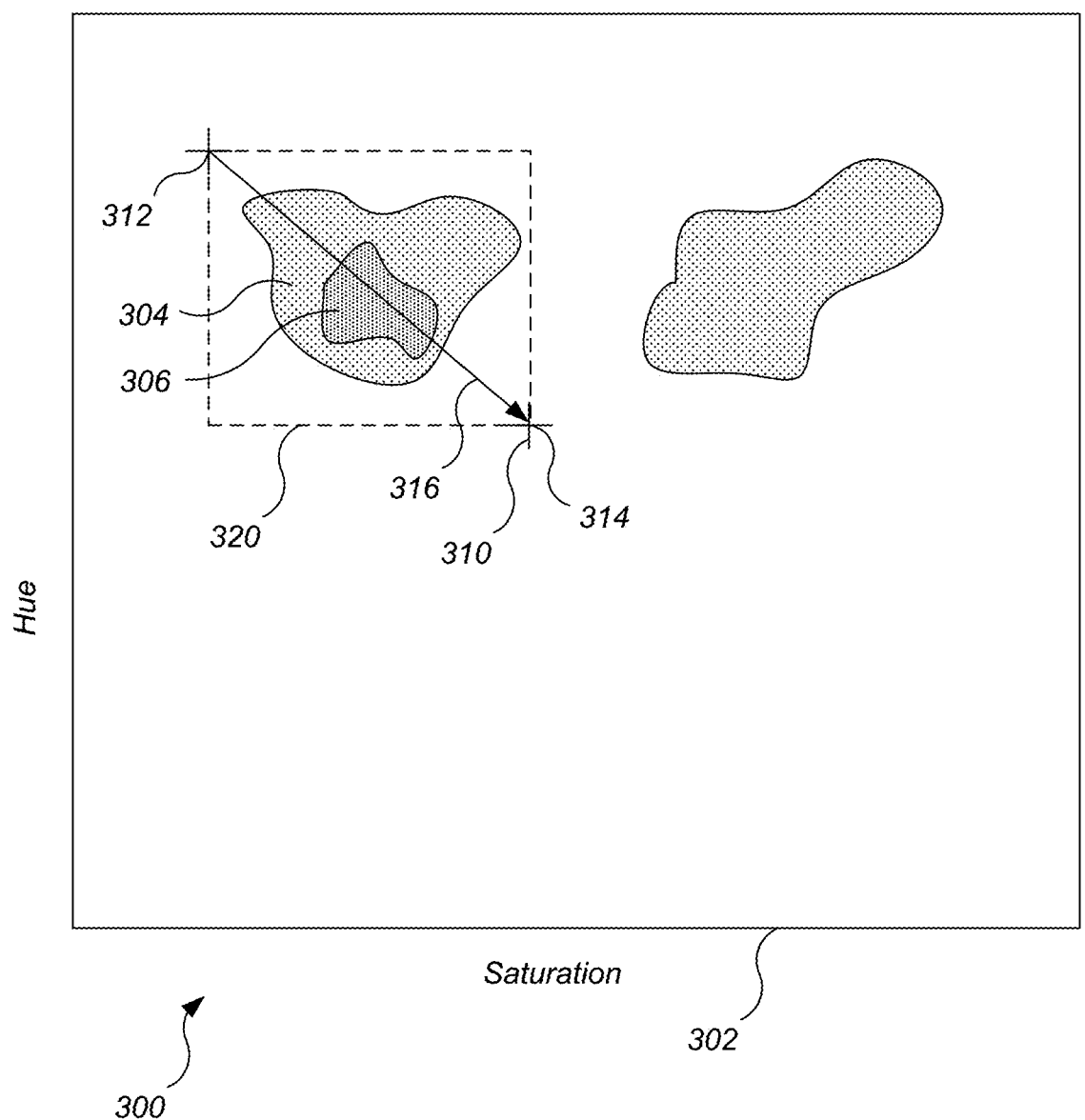
FIG. 8 illustrates a graphical-user interface to permit a user to select regions in a hue-saturation space.

A user interface for setting thresholds in the hue-saturation space is illustrated in FIG. 8. The user interface 300 displays a histogram 302 of a test substrate in the hue-saturation color space. For example, the system 100 can be used to generate a color image of a test substrate that is determined with a conventional metrology system, e.g., a profilometer, to meet required thickness specifications. The number of pixels in the image having a given combination of hue and saturation are counted to generate a histogram of the hue-saturation color space. When displayed, each coordinate in the histogram 302 can display an intensity that scales with the counted number of pixels. As a result, the histogram 302 can have regions of different intensity, e.g., a regions 306 having a greater intensity than a region 304 indicates that more pixels in the image have a particular combination of hue and saturation in region 306 than a given combination of hue and saturation in region 304.

The user interface 300 can also display a cursor 310 overlaid on the histogram 302. The position of the cursor 310 can be adjusted using an input device, e.g., a mouse or touch-sensitive screen. By clicking and dragging from a first position 312 to a second position 314 in the histogram 302 (shown by arrow 316), a selection box 320 can be defined. The boundaries of the selection box 320 thus define the upper and lower limits for the thresholds.

For example, for the histogram of FIG. 8 in which hue is shown on the y-axis and saturation on the x-axis, the upper hue limit UHL is the larger y-value of the first and second positions, the lower hue limit LHL is the smaller y-value of the first and second positions, the upper saturation limit USL is the larger x-value of the first and second positions, and the lower saturation limit LSL is the smaller x-value of the first and second positions. Of course, x and y values would be reversed if hue was shown on the x-axis and saturation on the y-axis.

Next, a uniformity analysis can be performed for each region of the substrate, e.g., each die, or for the entire image (step 280). For example, for each die, the total number of "failing" pixels within the die can be calculated. This total can be compared to a threshold to determine whether the die is acceptable, e.g., if the total is less than the threshold then the die is marked as acceptable. This gives a pass/fail indication for each die.

As another example, the total number of "failing" pixels within the unmasked region of the substrate can be calculated. This total can be compared to a threshold to determine whether the substrate is acceptable, e.g., if the total is less than the threshold then the substrate is marked as acceptable. The threshold can be set by a user. This gives a pass/fail indication for the substrate.

Where a die or a wafer is determined to "fail", the controller 190 can generate an alert or cause the polishing system 100 to take corrective action. For example, an audible or visual alert can be generated, or a data file can be generated indicating that a particular die is not usable. As another example, a substrate could be sent back for rework.

In contrast to spectrographic processing, in which a pixel typically is represented by 1024 or more intensity values, in a color image a pixel can be represented by just three intensity values (for hue, saturation and luminosity). Consequently, the computational load to process the color image is significantly lower.

In general, data can be used to control one or more operation parameters of the CMP apparatus. Operational parameters include, for example, platen rotational velocity, substrate rotational velocity, the polishing path of the substrate, the substrate speed across the plate, the pressure exerted on the substrate, slurry composition, slurry flow rate, and temperature at the substrate surface. Operational parameters can be controlled real-time, and can be automatically adjusted without the need for further human intervention.

As used in the instant specification, the term substrate can include, for example, a product substrate (e.g., which includes multiple memory or processor dies), a test substrate, a bare substrate, and a gating substrate. The substrate can be at various stages of integrated circuit fabrication, e.g., the substrate can be a bare wafer, or it can include one or more deposited and/or patterned layers. The term substrate can include circular disks and rectangular sheets.

However, the color image processing technique described above can be particularly useful in the context of 3D vertical NAND (VNAND) flash memory. In particular, the layer stack used in fabrication of VNAND is so complicated that current metrology methods (e.g., Nova spectrum analysis) may be unable to perform with sufficiently reliability in detecting regions of improper thickness. In contrast, the color image processing technique can have superior reliability in this application.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a non-transitory machine readable storage media, for execution by, or to control the operation of, data processing apparatus, e.g., a programmable processor, a computer, or multiple processors or computers.

Terms of relative positioning are used to denote positioning of components of the system relative to each other, not necessarily with respect to gravity; it should be understood that the polishing surface and substrate can be held in a vertical orientation or some other orientations.

A number of implementations have been described. Nevertheless, it will be understood that various modifications may be made. For example

- Rather than a line scan camera, a camera that images the entire substrate could be used. In this case, motion of the camera relative to the substrate is not needed.
- The camera could cover less than the entire width of the substrate. In this case, the camera would need to undergo motion in two perpendicular directions, e.g., be supported on an X-Y stage, in order to scan the entire substrate.
- The light source could illuminate the entire substrate. In this case, the light source need not move relative to the substrate.
- The light detector can be a spectrometer rather than a color camera; the spectra data can then be reduced to the HSL color space.
- The sensor assembly need not an in-line system positioned between polishing stations or between a polishing station and a transfer station. For example, the sensor assembly could be positioned within the transfer station, positioned in a cassette interface unit, or be a stand-alone system.
- The uniformity analysis step is optional. For example, the image generated by applying the threshold transformation can be fed into a feed-forward process to adjust a later processing step for the substrate, or into a feedback process to adjust the processing step for a subsequent substrate.

Accordingly, other implementations are within the scope of the claims.

What is claimed is:

1. A computer program product, comprising a non-transitory computer readable medium encoded with instructions to cause one or more processors to:
   store data indicating a boundary of an area in a 2-dimensional color space, the 2-dimensional color space having a pair of color channels including a first color channel and a second color channel as axes of the color space;
   store an image mask identifying one or more regions on a substrate;
   receive color data of a substrate from a camera;
   generate a color image of the substrate from the color data;
   for each pixel of a plurality of pixels within the regions identified by the image mask of the color image, perform a comparison of a pair of color values for the pair of color channels for the pixel to the boundary of the area in the 2-dimensional color space to determine whether the pair of color values meet thresholds provided by the boundary;
   count a number of pixels in the color image that fail to meet the thresholds and to compare the number of pixels to a second threshold;
   generate a signal to an operator based on results of the comparison for the plurality of pixels.

2. The computer program product of claim 1, comprising instructions to count a total number of pixels in all of one or more regions identified in the image mask, and to compare the total number to the second threshold.

3. The computer program product of claim 1, wherein the one or regions correspond to one or more dies on the substrate.

4. The computer program product of claim 3, comprising instructions to count a total number of pixels for each region of the one or more regions identified in the image mask, and to compare the total number for each region to the second threshold.

5. The computer program product of claim 4, comprising instructions to store a data file indicating that a die is unusable if the total number of pixels for a region corresponding to the die exceeds the second threshold.

6. The computer program product of claim 1, wherein the pair of color channels does not include a luminance channel.

7. A computer program product, comprising a non-transitory computer readable medium encoded with instructions to cause a processor to:
   display on a display a graph of a 2-dimensional color space having a pair of color channels including a first color channel and a second color channel as axes of the color space, the graph providing a histogram of an image of a substrate for the 2-dimensional color space;
   receive user input selecting a portion of the graph, the user input including clicking and dragging from a first position to a second position in the graph;
   generate data indicating a boundary of an area in the 2-dimensional color space based on the user input with a pixel of the image having a pair of color values within the area indicating that a corresponding position on the substrate meets a thickness requirement;
   receive color data of a second substrate from a camera;
   generate a color image of the second substrate from the color data;
   for each pixel of a plurality of pixels of the color image, perform a comparison of a pair of color values for the pair of color channels for the pixel to the boundary of the area in the 2-dimensional color space to determine whether the pair of color values meet thresholds provided by the boundary; and
   generate a signal to an operator based on results of the comparison for the plurality of pixels.

8. The computer program product of claim 7, wherein the pair of color channels does not include a luminance channel.

9. The computer program product of claim 7, comprising instructions to count a number of pixels in the color image that fail to meet the thresholds and to compare the number of pixels to a second threshold.

10. The computer program product of claim 9, comprising instructions to store an image mask identifying one or more regions on the substrate, wherein the plurality of pixels are pixels within the regions identified by the image mask.

11. The computer program product of claim 7, comprising instructions to analyze the color image to find a wafer alignment feature and to transform the color image to a standard coordinate system.

12. The computer program product of claim 7, comprising instructions to normalize the color image.

13. The computer program product of claim 7, comprising instructions to apply a high-pass spatial filter to the image.

14. The computer program product of claim 7, wherein the pair of color channels does not include a luminance channel.

15. A computer program product, comprising a non-transitory computer readable medium encoded with instructions to cause one or more processors to:
- receive color data of a substrate from a line-scan camera that scans across the substrate along a first axis;
- generate a color image of the substrate from the color data;
- average pixel values of the color image only along an image axis corresponding to the first axis to generate a smoothed color image, wherein the instructions to average pixel values comprise instructions to average pixel values within a threshold distance; and
- generate a signal to an operator based on the smoothed color image.

16. The computer program product of claim 15, comprising instructions to generate a filtered image by dividing the color image by the smoothed color image.

17. The computer program product of claim 15, comprising instructions to:
- store data indicating a boundary of an area in a 2-dimensional color space, the 2-dimensional color space having a pair of color channels including a first color channel and a second color channel as axes of the color space;
- for each pixel of a plurality of pixels of the smoothed color image, perform a comparison of a pair of color values for the pair of color channels for the pixel to the boundary of the area in the 2-dimensional color space to determine whether the pair of color values meet thresholds provided by the boundary; and
- generate a signal to an operator based on results of the comparison for the plurality of pixels.

* * * * *

UNITED STATES PATENT AND TRADEMARK OFFICE
CERTIFICATE OF CORRECTION

PATENT NO. : 11,715,193 B2
APPLICATION NO. : 16/744058
DATED : August 1, 2023
INVENTOR(S) : Dominic J. Benvegnu et al.

It is certified that error appears in the above-identified patent and that said Letters Patent is hereby corrected as shown below:

In the Claims

In Column 12, Line 11, Claim 3, before "regions" insert -- more --.

Signed and Sealed this
Nineteenth Day of September, 2023

Katherine Kelly Vidal
Director of the United States Patent and Trademark Office